US 11,813,597 B2

(12) United States Patent
Beall et al.

(10) Patent No.: US 11,813,597 B2
(45) Date of Patent: Nov. 14, 2023

(54) HONEYCOMB BODIES WITH VARYING CELL DENSITIES AND EXTRUSION DIES FOR THE MANUFACTURE THEREOF

(71) Applicant: CORNING INCORPORATED, Corning, NY (US)

(72) Inventors: Douglas Munroe Beall, Painted Post, NY (US); Priyank Paras Jain, Horseheads, NY (US); Kenneth Richard Miller, Addison, NY (US); Artemii Alexandrovitch Shamkin, Saint Petersburg (RU)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/042,547

(22) PCT Filed: Mar. 28, 2019

(86) PCT No.: PCT/US2019/024465
§ 371 (c)(1),
(2) Date: Sep. 28, 2020

(87) PCT Pub. No.: WO2019/191354
PCT Pub. Date: Oct. 3, 2019

(65) Prior Publication Data
US 2021/0031178 A1 Feb. 4, 2021

Related U.S. Application Data

(60) Provisional application No. 62/649,849, filed on Mar. 29, 2018.

(51) Int. Cl.
*B01D 46/24* (2006.01)
*B01J 35/04* (2006.01)
(Continued)

(52) U.S. Cl.
CPC ............ *B01J 35/04* (2013.01); *B01D 46/247* (2013.01); *B01D 46/2474* (2013.01);
(Continued)

(58) Field of Classification Search
None
See application file for complete search history.

(56) References Cited

U.S. PATENT DOCUMENTS 3,885,977 A 5/1975 Lachman et al.
3,963,504 A 6/1976 Lundsager
(Continued)

FOREIGN PATENT DOCUMENTS

DE 102007053084 A1 5/2009
EP 3282105 A1 * 2/2018 ............ B01D 53/94
(Continued)

OTHER PUBLICATIONS

Tsuzuki et al., machine translation of JP S54-110189, Aug. 29, 1979 (Year: 1979).*
(Continued)

*Primary Examiner* — Mary I Omori
(74) *Attorney, Agent, or Firm* — Joseph M. Homa

(57) ABSTRACT

A honeycomb body (300) including a plurality of radially-extending walls (322) intersecting with a plurality of circumferentially-extending walls (324), the plurality of radially-extending walls (322) and the plurality of circumferentially-extending walls (324) form a plurality of circumferential zones (334A, 334B, 334C) of cells (308). The plurality of circumferential zones (334A, 334B, 334C) of cells (308) includes a first zone of cells (334A) including two or more first rings of cells (330) and having a first cell density, and a second zone of cells (334B) including two or (Continued)

more rings of cells (330) having varying cell densities across the two or more rings of cells. Other structures and extrusion dies are disclosed.

22 Claims, 12 Drawing Sheets

(51) Int. Cl.
*B01D 53/88* (2006.01)
*B28B 3/26* (2006.01)
*C04B 38/00* (2006.01)
*C04B 111/00* (2006.01)

(52) U.S. Cl.
CPC ..... *B01D 46/2482* (2021.08); *B01D 46/2484* (2021.08); *B01D 53/885* (2013.01); *B28B 3/269* (2013.01); *C04B 38/0009* (2013.01); B01D 2255/92 (2013.01); C04B 2111/0081 (2013.01); F01N 2330/48 (2013.01); F01N 2330/60 (2013.01)

(56) References Cited

U.S. PATENT DOCUMENTS

| | | | |
|---|---|---|---|
| 4,298,328 A | 11/1981 | Frost | |
| 4,349,329 A | 9/1982 | Naito et al. | |
| 5,332,703 A | 7/1994 | Hickman | |
| 5,641,332 A | 6/1997 | Faber et al. | |
| 5,873,998 A | 2/1999 | Grangeon et al. | |
| 6,221,308 B1 | 4/2001 | Peng | |
| 6,259,078 B1 | 7/2001 | Araya | |
| 6,391,421 B1 | 5/2002 | Brueck et al. | |
| 6,391,813 B1 | 5/2002 | Merkel | |
| 6,541,407 B2 | 4/2003 | Beall et al. | |
| 7,017,278 B2 | 3/2006 | Kato | |
| 7,575,793 B2 | 8/2009 | Aniolek et al. | |
| 7,596,885 B2 | 10/2009 | Adrian et al. | |
| 8,257,460 B2 | 9/2012 | Komori et al. | |
| 8,852,311 B2 | 10/2014 | Komori et al. | |
| 8,974,724 B2 | 3/2015 | Day et al. | |
| 9,005,517 B2 | 4/2015 | Bronfenbrenner et al. | |
| 9,038,284 B2 | 5/2015 | Feldman et al. | |
| 9,335,093 B2 | 5/2016 | Feldman et al. | |
| 9,446,560 B2 | 9/2016 | Bronfenbrenner et al. | |
| 9,452,578 B2 | 9/2016 | Bronfenbrenner et al. | |
| 9,533,294 B2 | 1/2017 | Hayashi et al. | |
| 2007/0231533 A1 | 10/2007 | Aniolek et al. | |
| 2010/0037573 A1* | 2/2010 | Komori | B01D 46/247 55/419 |
| 2015/0377109 A1* | 12/2015 | Hayashi | F01N 3/2828 428/116 |
| 2016/0038877 A1* | 2/2016 | Aoki | B01D 53/9431 422/180 |
| 2017/0266908 A1* | 9/2017 | Kawakami | F01N 3/2828 |
| 2017/0274554 A1* | 9/2017 | Kawakami | F01N 3/26 |
| 2020/0254433 A1 | 8/2020 | Halder | |

FOREIGN PATENT DOCUMENTS

| | | | |
|---|---|---|---|
| JP | 54-110189 U | | 8/1979 |
| JP | 54110189 A | * | 8/1979 |
| JP | 2015194119 A | * | 11/2015 |
| WO | 2008/066765 A1 | | 6/2008 |
| WO | 2014/046912 A1 | | 3/2014 |

OTHER PUBLICATIONS

International Search Report and Written Opinion of the International Searching Authority; PCT/US2019/024465; dated Jun. 24, 2019; 22 Pages; European Patent Office.
Kim et al; "Improving Flow Efficiency of a Catalytic Converter Using the Concept of Radially Variable Cell Density—Part I"; SAE Technical Paper Series; 1999; 8 Pages.

* cited by examiner

HONEYCOMB BODIES WITH VARYING CELL DENSITIES AND EXTRUSION DIES FOR THE MANUFACTURE THEREOF

CROSS-REFERENCE TO RELATED APPLICATIONS

This application is a National Stage application under 35 U.S.C. § 371 of International Application No. PCT/US2019/024465 filed on Mar. 28, 2019, which claims the benefit of priority under 35 U.S.C § 119 of U.S. Provisional Application Ser. No. 62/649,849 filed on Mar. 29, 2018, the content of which is hereby incorporated by reference in their entireties.

FIELD

The following description relates generally to honeycomb bodies having varying cell densities and extrusion dies for extruding honeycomb bodies having varying cell densities.

BACKGROUND

Ceramic honeycomb bodies with varying cell densities can be utilized in exhaust after-treatment systems, such as in catalytic converters and particulate filters.

SUMMARY

Illustrative embodiments of the present disclosure are directed to a honeycomb body comprising: a plurality of intersecting porous walls comprised of a plurality of radially-extending walls and a plurality of circumferentially-extending walls, wherein the intersecting porous walls are comprised of porous ceramic material; wherein the plurality of radially-extending walls and the plurality of circumferentially-extending walls form a plurality of circumferential zones of cells; and wherein the plurality of circumferential zones of cells comprises: a first zone of cells comprising two or more rings of cells and having a first cell density; and a second zone of cells comprising two or more rings of cells having varying cell densities across the two or more rings of cells.

In some embodiments, the cell densities vary linearly across the second zone of cells.

In some embodiments, the cell densities vary according to a trigonometric function across the second zone of cells.

In some embodiments, the first zone of cells is located adjacent to a center of the honeycomb body.

In some embodiments, the plurality of circumferential zones of cells comprises a third zone of cells comprising one or more rings of cells, wherein the second zone of cells is located between the first zone of cells and the third zone of cells.

In some embodiments, the third ring of cells has a third cell density which is different from the first cell density.

In some embodiments, the circumferentially-extending walls have circumferentially-extending wall thicknesses and the radially-extending walls have radially-extending wall thicknesses, and at least one of the circumferentially-extending wall thicknesses and the radially-extending wall thicknesses change as a function of their distance to a center of the honeycomb body.

In some embodiments, the circumferentially-extending walls have circumferentially-extending wall thicknesses and the radially-extending walls have radially-extending wall thicknesses, and at least one of the thicknesses of the circumferentially-extending walls and the radially-extending walls increase linearly in the first zone of cells.

In some embodiments, at least one of the thicknesses of the circumferentially-extending walls and the radially-extending walls are constant in the second zone of cells.

In some embodiments, at least one of the thicknesses of the circumferentially-extending walls and the radially-extending walls increase linearly with a first slope in the first zone of cells, and at least one of the thicknesses of the circumferentially-extending walls and the radially-extending walls increases linearly with a second slope in the second zone of cells.

In some embodiments, at least one of the circumferentially-extending walls and the radially-extending walls have a first constant thickness in the first zone of cells, and at least one of the circumferentially-extending walls and the radially-extending walls have a second constant thickness in the second zone of cells.

In some embodiments, the circumferentially-extending walls have circumferentially-extending wall thicknesses and the radially-extending walls have radially-extending wall thicknesses, and at least one of the thicknesses of the circumferentially-extending walls and the radially-extending walls increase as a trigonometric function in the first zone of cells.

In some embodiments, at least one of the thicknesses of the circumferentially-extending walls and the radially-extending walls are constant in the second zone of cells.

Illustrative embodiments of the present disclosure are directed to a honeycomb body comprising: a plurality of intersecting porous walls comprised of a plurality of radially-extending walls and a plurality of circumferentially-extending walls, wherein the intersecting porous walls are comprised of porous ceramic material; wherein the plurality of radially-extending walls and the plurality of circumferentially-extending walls form a plurality of circumferential zones of cells, wherein the plurality of circumferential zones of cells comprise: an inner zone of cells comprising two or more inner rings of cells and having an inner cell density; an outer zone of cells comprising two or more outer rings of cells having an outer cell density; and one or more intermediate zones of cells, wherein each intermediate zone of cells comprises one or more rings of cells having one or more intermediate zone cell densities between the inner cell density and the outer cell density.

In some embodiments, the inner cell density is between 400 and 900 cells per square inch.

In some embodiments, the outer cell density is between 100 and 600 cells per square inch.

In some embodiments, one or more of the intermediate zone cell densities is greater than or equal to 100 cells per square inch and less than or equal to 900 cells per square inch.

In some embodiments, the inner cell density in the inner zone of cells is greater than the outer cell density in the outer zone of cells.

In some embodiments, cell densities between the inner zone of cells and the one or more intermediate zones of cells vary step-wise.

In some embodiments, cell densities between the outer zone of cells and the one or more intermediate zones of cells vary step-wise.

In some embodiments, one or more intermediate zone cell densities vary as an exponential function across at least one intermediate zone of cells.

In some embodiments, the one or more intermediate zone cell densities vary linearly across at least one intermediate zone of cells.

In some embodiments, the one or more intermediate zone cell densities vary as a trigonometric function across at least one intermediate zone of cells.

In some embodiments, the one or more intermediate zone cell densities varies nonlinearly across at least one intermediate zone of cells.

In some embodiments, the plurality circumferentially-extending walls have circumferentially-extending wall thicknesses and the plurality of radially-extending walls have radially-extending wall thicknesses, and at least one of the circumferentially-extending wall thicknesses and the radially-extending wall thicknesses change as a function of their radial distance to a center of the honeycomb body.

Illustrative embodiments of the present disclosure are directed to a honeycomb body comprising: a plurality of intersecting porous walls comprised of a plurality of radially-extending walls and a plurality of circumferentially-extending walls, wherein the plurality of radially-extending walls and the plurality of circumferentially-extending walls form a plurality of circumferential zones of cells; a first circumferential zone of cells having two or more rings of cells and having a first cell density; a second circumferential zone of cells having two or more rings of cells and having a second cell density, the first cell density being greater than the second cell density; and a transition zone between the first circumferential zone of cells and the second circumferential zone of cells, wherein all radially extending walls in the first circumferential zone of cells adjacent the transition zone extend through the transition zone and into the second circumferential zone of cells.

In some embodiments, the radially-extending walls of cells in the second circumferential zone of cells adjacent an outer side of the transition zone extend further radially than radially-extending walls of cells in the first circumferential zone of cells adjacent an inner side of the transition zone.

Illustrative embodiments of the present disclosure are directed to a honeycomb body comprising: a plurality of intersecting porous walls comprised of a plurality of radially-extending walls and a plurality of circumferentially-extending walls; wherein the plurality of radially-extending walls and the plurality of circumferentially-extending walls form a plurality of circumferential zones of cells, and wherein the plurality of circumferential zones of cells comprise: an inner ring of cells having an inner cell density, an outer ring of cells having an outer cell density, $1.25 \leq CDR \leq 4.0$, wherein CDR is a cell density ratio of the inner cell density to the outer cell density of the honeycomb body, and cell densities of rings of cells varies linearly between the inner ring of cells and the outer ring of cells.

In some embodiments, the cell densities of the rings of cells varies linearly between the inner ring of cells and the outer ring of cells.

Illustrative embodiments of the present disclosure are directed to a honeycomb extrusion die comprising: a die body comprising an inlet face, an exit face, and a plurality of pins disposed on the exit face and arranged to define a matrix of intersecting radially-extending slots and circumferentially-extending slots formed therebetween, wherein the radially-extending slots and the circumferentially-extending slots form a plurality of circumferential zones of pins, and wherein the plurality of circumferential zones of pins comprises: a first zone of pins comprising two or more rings of pins and having a first pin density; and a second zone of pins comprising two or more rings of pins having varying pin densities between the two or more rings of pins.

Illustrative embodiments of the present disclosure are directed to a honeycomb extrusion die comprising: a die body comprising an inlet face, an exit face, and a plurality of pins disposed on the exit face and arranged to define a matrix of intersecting radially-extending slots and circumferentially-extending slots formed therebetween, wherein the radially-extending slots and the circumferentially-extending slots form a plurality of circumferential zones of pins; and wherein the plurality of circumferential zones of pins comprise: an inner ring of pins having an inner pin density, an outer ring of pins having an outer pin density, and the die body comprises a $1.25 \leq PDR \leq 4.0$, wherein PDR is a pin density ratio of the inner pin density to the outer pin density.

Additional features of the disclosure will be set forth in the description which follows, and in part will be apparent from the description, or may be learned by practice of the disclosure. It is to be understood that both the foregoing general description and the following detailed description are explanatory and are intended to provide further explanation of the disclosure.

BRIEF DESCRIPTION OF THE DRAWINGS

The accompanying drawings, which are included to provide a further understanding of the disclosure are incorporated in and constitute a part of this specification, illustrate embodiments of the disclosure, and together with the description serve to explain the disclosure.

DETAILED DESCRIPTION

Figure 1A:
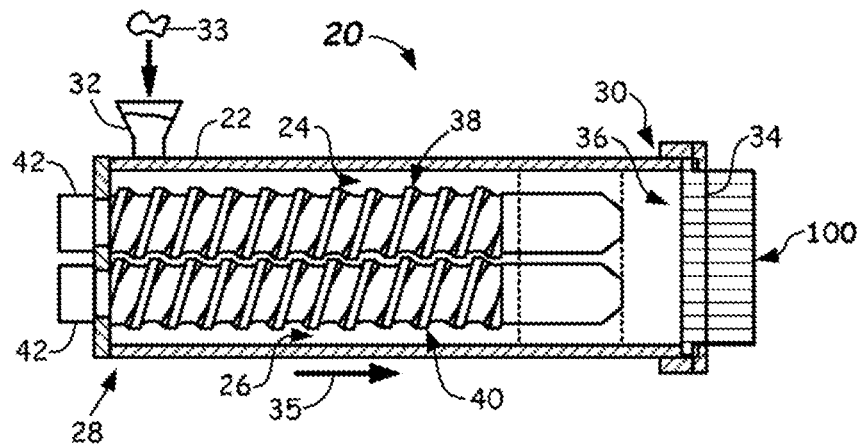
FIG. 1A illustrates a partially-cross sectioned plan view schematic diagram of an extruder (e.g., twin-screw extruder) according to some embodiments.

After-treatment of exhaust gas from internal combustion engines may use catalysts supported on high-surface area substrates and, in the case of diesel engines and some gasoline direct injection engines, a catalyzed or uncatalyzed filter for the removal of particles from the exhaust stream. Filters and catalyst supports in these applications may be refractory, thermal shock resistant, stable under a range of $pO_2$ conditions, non-reactive with the catalyst material, and offer low resistance to exhaust gas flow there-through. Porous flow-through honeycomb substrates and porous wall-flow honeycomb filters may be used in these applications. Porous flow-through honeycomb substrates and porous wall-flow honeycomb filters may comprise a porous ceramic honeycomb body.

A honeycomb body can be formed from a mixture that comprises, for example, one or more ceramic-forming components. The ceramic-forming components may comprise ceramics, ceramic precursors, or both. The mixture may further comprise one or more of: an organic binder(s), an inorganic binder, a liquid vehicle, an optional pore former, rheology modifier, or the like. After the honeycomb body is formed from the mixture, the honeycomb body is heated (e.g., preferably dried, and then fired or sintered) to form a honeycomb body comprised of a porous ceramic material. The porous ceramic material preferably comprises an open and interconnected pore system, preferably suitable for exhaust after-treatment purposes. The ceramic material of the honeycomb body may comprise, for example, cordierite, aluminum titanate, alumina, mullite, silicon carbide, silicon nitride, and the like, and combinations thereof. Porous walls of the honeycomb body may comprise a bulk porosity in a range between about 25% and about 85% as measured by mercury porosimetry, in some embodiments a porosity of at least about 35%, in some embodiments at least about 45%, in some embodiments at least about 55%, in some embodiments at least about 60%, and in some embodiments at least about 65%. Values of percent porosity may be determined by mercury porosimetry.

In some embodiments, the honeycomb body is formed by an extrusion method, where a ceramic or ceramic-forming mixture is extruded into a green honeycomb form, dried, and then fired to form a porous ceramic honeycomb body. The extrusion can be performed using any suitable extruder, such as a hydraulic ram extrusion press, a two stage de-airing single auger extruder, or a twin-screw extruder, each with an extrusion die of a die assembly attached to the discharge end thereof.

Honeycomb extrusion dies employed to produce such honeycomb bodies can be multi-component assemblies comprising, for example, a wall-forming die body combined with a skin-forming mask. For example, U.S. Pat. Nos. 4,349,329 and 4,298,328 disclose die structures comprising skin-forming masks. The die body may incorporate mixture feedholes leading to, and intersecting with, an array of discharge slots formed in the die face, through which the ceramic-forming mixture is extruded. The extrusion method forms an interconnecting array of crisscrossing walls forming a honeycomb structure. A mask can be employed to form an outer peripheral skin, and the mask can be a ring-like circumferential structure, such as in the form of a collar, defining the periphery of the skin of the honeycomb body. The circumferential skin layer of the honeycomb body can be formed by extruding the ceramic-forming mixture adjacent to the mask.

The extruded mixture, referred to as an extrudate, can be cut into relevant lengths to create honeycomb bodies comprising the honeycomb bodies, such as to form honeycomb bodies shaped and sized to meet the needs of engine manufacturers. The extrudate can alternatively be in the form of honeycomb segments, which can be connected or bonded together to form the final honeycomb body. These honeycomb segments and resulting honeycomb body can be of any size or shape.

In some embodiments, as a honeycomb body is extruded, an external extruded surface (a skin) can be provided along the length of the honeycomb body. Under some circumstances, it may be necessary to remove the external surface. For example, a green extruded honeycomb body may be shaped to a desired shape and size by removing the extruded external surface. Alternatively, the green honeycomb body may be fired and then ground to the desired shape and size by removing the external extruded surface and any portion of the porous wall structure necessary to attain a desired shape and size. Shaping can be accomplished by any means known in the art, comprising cutting, sanding, or grinding away the external extruded surface of the honeycomb body to achieve the desired shape and size.

Honeycomb segments may also be shaped to a desired shape and size by removing the extruded external surface before integrating the segments into the honeycomb body. Alternatively, the honeycomb segments can be integrated to form a honeycomb body and the formed honeycomb body shaped to the desired shape and size.

After the desired shape and size has been attained, a skin material can be applied to an outer periphery of the newly-sized structure to form a new external surface, or skin, on the honeycomb body (an after-applied skin). In some embodiments, the ends of the honeycomb body are not covered with the skin material (not plugged), although certain passages may be plugged, if desired. After the skin composition has been applied to the honeycomb body, the skin composition can be dried and/or calcined. In some embodiments, a cold-set cement composition may be applied to the honeycomb body to form the after-applied skin. In some embodiments, a honeycomb core over which the cement is applied comprises fired ceramic material. In other embodiments, the honeycomb core comprises a green body or a calcined body.

FIG. 1A shows a side cross-sectioned view of an embodiment of an extruder 20 (e.g., a continuous twin-screw extruder). The extruder 20 comprises a barrel 22 that comprises a first chamber portion 24 and a second chamber portion 26 formed therein and in communication with each other. The barrel 22 can be monolithic or the barrel can be formed from a plurality of barrel segments for example connected successively in a longitudinal (e.g., axial) direction. The first chamber portion 24 and the second chamber portion 26 extend through the barrel 22 in the longitudinal direction between an upstream side 28 and a downstream side 30. At the upstream side 28 of the barrel 22, a material supply port 32 can be provided for supplying a mixture 33 to the extruder 20. The material supply port 32 can comprise a hopper or other material supply structure. A honeycomb extrusion die 34 is provided at a discharge port 36 at the downstream side 30 of the barrel 22 for extruding the mixture into a desired shape, such as extrudate 100 or the like. The honeycomb extrusion die 34 can be coupled to the discharge port 36 of the barrel 22, such as at an end of the barrel 22. The honeycomb extrusion die 34 can be preceded by other structures, such as a generally open cavity, screen/homogenizer, or the like to facilitate the formation of a steady plug-type flow front before the mixture material 33 reaches the honeycomb extrusion die 34.

As shown in FIG. 1A, a pair of extruder screws is mounted in the barrel 22. A first screw 38 is rotatably mounted at least partially within the first chamber portion 24 and a second screw 40 is rotatably mounted at least partially within the second chamber portion 26. The first screw 38 and the second screw 40 can be arranged generally parallel to each other, as shown in FIG. 1A. In other embodiments, first screw 38 and second screw 40 are arranged at various angles relative to each other. The first screw 38 and the second screw 40 can also be coupled to a driving mechanism 42 outside of the barrel 22 for rotation in the same or different directions. It is to be understood that both the first screw 38 and the second screw 40 can be coupled to a single driving mechanism or, as shown, to individual driving mechanisms 42. The first screw 38 and the second screw 40 move the mixture 33 through the barrel 22 with pumping and mixing action in an axial direction 35. Further supporting structure (shown dotted) can be provided to support the first screw 38 and the second screw 40 along their length. Such support structure can comprise perforations or holes therein to allow the mixture 33 to flow there-through.

Figure 1B:
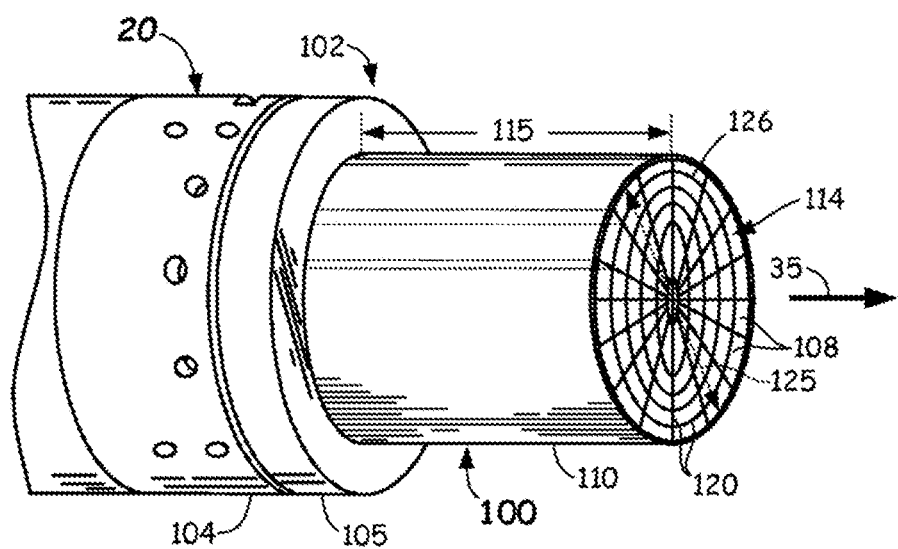
FIG. 1B illustrates a perspective partial view diagram of an extruder front end and an extrudate being extruded according to some embodiments.

FIG. 1B is a perspective illustration showing an end of the extruder 20 and an extrudate 100 being extruded therefrom. The extruder 20 is shown with an extruder front end 102 being where the mixture 33 exits the extruder 20 as the extrudate 100. An extruder cartridge 104 located proximate the extruder front end 102 can comprise extrusion hardware such as the honeycomb extrusion die 34 (not shown in FIG. 1B) and a skin forming mask 105. The extrudate 100 comprises a first end face 114 and a length 115 extending between the extruder front end 102 and the first end face 114. The extrudate 100 comprises a plurality of channels 108, and an outer peripheral surface 110. A plurality of intersecting walls 120 form the channels 108 that extend in the axial direction 35. For example, intersecting walls 120 forming a channel 108 extending in the axial direction 35 are shown by dashed lines for illustration. A maximum cross-sectional dimension perpendicular to the axial direction 35 is indicated by dimension 125. For example, when the cross-section of the first end face 114 of the extrudate 100 is circular, the maximum dimension 125 is a diameter of the circular first end face 114. When the cross-section of the first end face 114 of the extrudate 100 is rectangular, the maximum dimension 125 is a diagonal of the rectangular first end face 114. The cross-section of the first end face 114 can be elliptical, race-track shape, square, rectangular non-square, triangular, hexagonal, octagonal, asymmetrical, symmetrical, or other desired shapes, and combinations thereof.

Upon exiting the extruder 20 in the axial direction 35, the extrudate 100 comprises a honeycomb network 126 of axially extending intersecting walls 120 that form the axially-extending channels 108 and the axially-extending outer peripheral surface 110. The outer peripheral surface 110 can be an integrally formed co-extruded skin or an after-applied skin.

While extrusion is illustrated as being horizontally oriented in FIG. 1B, this disclosure is not so limited and extrusion can be horizontal, vertical, at some combination or incline thereto. In some embodiments, the extrudate 100 comprises a honeycomb structure with an average cell density between about 100 and 1,500 cells per square inch (cpsi) (between about 15.5 and 232.5 cells per square cm).

The walls 120 can have thicknesses ranging from about 0.038 mm to about 1.52 mm (about 1.5 mils to 60 mils, where one mil is 0.001 inch). For example, the honeycomb geometries of the extrudate 100 can have an average cell density of 400 cpsi with a wall thickness of about 8 mils (400/8) or with a wall thickness of about 6 mils (400/6). Other geometries of the green honeycomb body 200 comprise, for example, combinations of average cell density/wall thickness of 100/17, 200/12, 200/19, 270/19, 600/4, 400/4, 600/3, 750/2, and 900/2.

Figure 2:
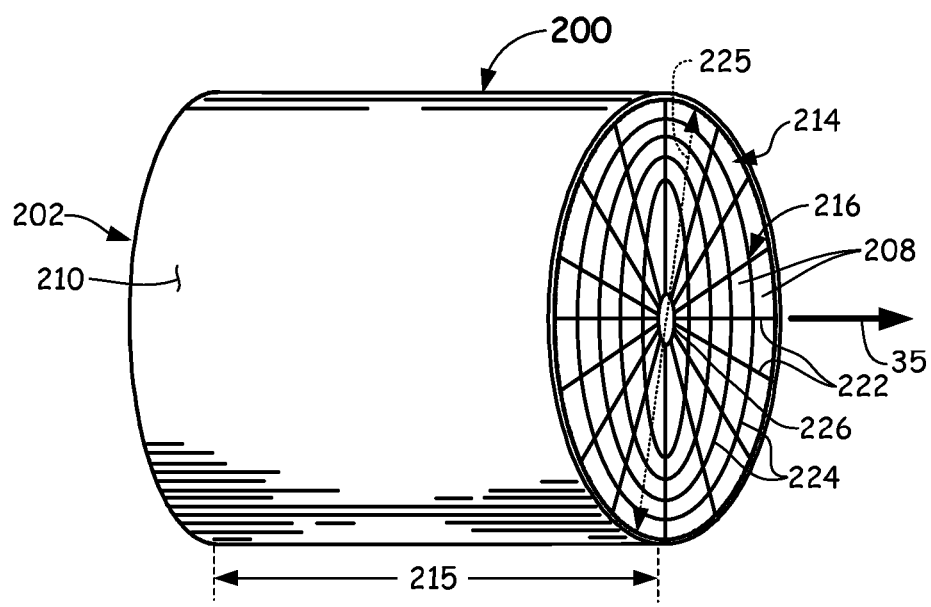
FIG. 2 illustrates a perspective view of a honeycomb body according to some embodiments.

With additional reference to FIG. 2, upon exiting the extruder 20, the mixture is formed into an extrudate 100 that can be cut to a second length 215 to form a green honeycomb body extending between a first end face 202 and a second end face 214, such as the honeycomb body 200 shown in FIG. 2. Specifically, the extrudate 100 (FIG. 1B) can be cut to form the green honeycomb body 200. Cutting can be achieved by wire cutting, saw cutting, such as a band saw or reciprocating saw, laser cutting, or other cutting method. As used herein, the term "green honeycomb body" refers to a body that has been cut from the extrudate and that has not been fired.

As shown in FIG. 2, the honeycomb body 200 comprises a plurality of radially-extending walls 222 that intersect with a plurality of circumferentially-extending walls 224 to form (i) mutually adjoining channels 208 extending in the axial direction 35 between the first end face 202 and the second end face 214 and (ii) a honeycomb matrix 216 of intersecting walls 222, 224. It is to be appreciated that the term "circumferential" or "circumferentially" as used herein refers to angularly-orientated walls or other components that are generally concentric with respect to an outer periphery of the honeycomb body or other object being discussed. A maximum cross-sectional dimension perpendicular to the axial direction 35 is indicated by diameter 225. The radially-extending walls that are also referred to herein as radial walls and the circumferentially-extending walls are also referred to herein as circumferential walls. The axial direction 35 can extend normal to the second end face 214. At least some of the radial walls 222 may intersect the periphery of an opening 226 in the second end face 214. The opening 226 may be located at a central location where at least some of the radial walls 222 may converge. The opening 226 can be a cell or a plurality of cells that extend from the first end face 202 to the second end face 214. The opening 226 is depicted as being circular, but the opening can have other shapes.

The circumferentially-extending walls 224 can be curved, with curved circumferentially-extending walls between adjacent radial walls 222. In some embodiments, the circumferentially-extending walls 224 may be straight and produce straight circumferentially-extending walls between adjacent radial walls 222.

The first end face 202 can be an inlet face and the second end face 214 can be an outlet face of the honeycomb body 200. The outer peripheral surface 210 of the honeycomb body 200 extends axially between the first end face 202 and the second end face 214. As used herein, the honeycomb body 200 can be a log that can undergo further processing prior to firing (e.g., additional cutting after drying) or the honeycomb body 200 can be a final-sized honeycomb body substantially ready for firing or a structure that has been fired.

The thermal mass of honeycomb bodies used in catalytic converter applications can play a role in determining catalytic performance, for example, during cold start stages and low temperature engine cycles. In some embodiments, the honeycomb bodies disclosed herein may provide lower thermal mass and higher heat exchange surface area as well as larger open frontal area for providing lower back pressure than present conventional ceramic honeycomb products.

The radial walls 222 and circumferential walls 224 of the honeycomb body 200 are coated in some embodiments. For example, if the honeycomb body 200 is used in a catalytic converter, the radial walls 222 and the circumferential walls 224 can be coated with a catalyst-containing coating for exhaust after-treatment. The catalyst material may comprise metals, such as platinum and palladium. In exhaust configurations, the exhaust flow profile may not be uniform across the first end face 202 of the honeycomb body 200. For example, a higher exhaust flow may be located at a central portion of the second end face 214 of the honeycomb body 200 than at peripheral regions surrounding the central portion. In order to improve efficiency, the honeycomb body 200 disclosed herein can comprise higher cell densities in interior or central regions than in outer or peripheral regions. The resulting catalytic converter or other coated device or filter can therefore comprise a high concentration of catalyst or other coating (e.g., a catalyst-containing washcoat) in the interior region of the honeycomb body 200 where the highest exhaust flow is located during usage. The outer regions of the honeycomb body 200 have lower cell densities and thus less catalyst is provided on and/or in the walls 222, 224 in these outer areas where exhaust flow velocity is lower. The resulting honeycomb bodies 200 are more efficient than traditional honeycomb bodies because the highest concentration of catalyst-containing coating for these honeycomb bodies 200 is located in areas where the exhaust flow velocity is the highest.

Figure 3A:
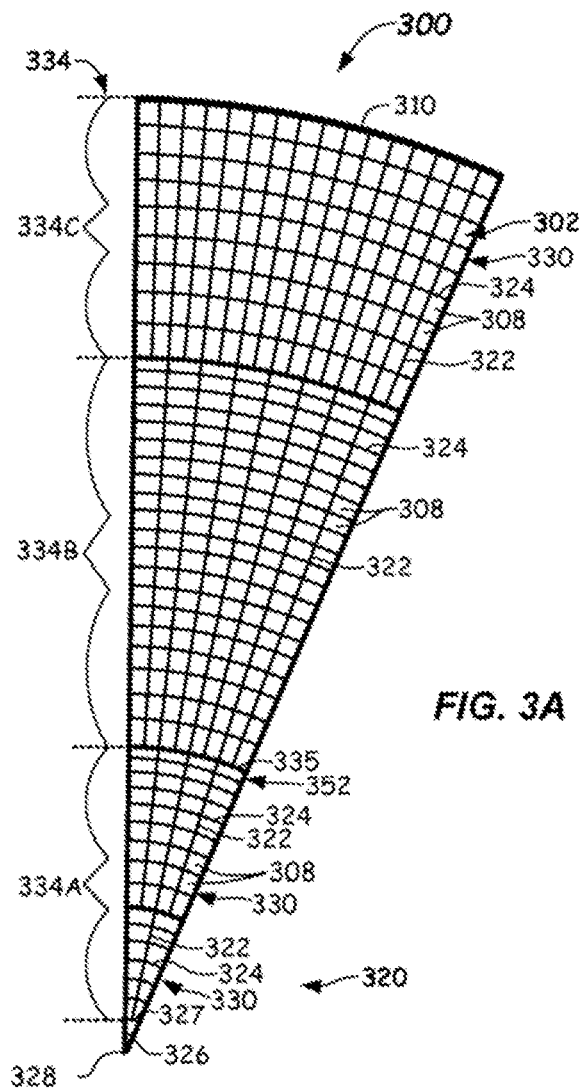
FIG. 3A illustrates a partial plan view of a segment of an end face of a honeycomb body according to some embodiments.

Reference is now made to FIG. 3A, which is a partial plan view of a segment (pie shaped segment) of an end face 302 (e.g., inlet end face) of a honeycomb body 300. The honeycomb body 300 can be surrounded by a peripheral skin 310 as described above with reference to FIG. 1B. The honeycomb body 300 comprises a plurality of radial walls 322. The honeycomb body 300 can also comprise a plurality of circumferential walls 324. The radial walls 322 and the circumferential walls 324 intersect with one another throughout to form a plurality of cells 308 that extend through the honeycomb body 300 normal to the end face 302.

The honeycomb body 300 has a central region 320 that can be centrally located on the end face 302. The central region 320 may comprise an opening 326 wherein at least some of the radial walls 322 intersect a peripheral surface 327 of the opening 326. Some of the radial walls 322 intersect at a central point 328, which is central to the end face 302 and may be located within the opening 326. All the radial walls 322 in the illustrated embodiment extend along radial directions that, if extended, intersect at the central point 328. The radial walls 322 extend radially in directions between the central point 328 and the peripheral skin 310. The opening 326 enables the cross-sectional areas of cells 308 of the honeycomb body 300 near the central point 328 to be large enough so that pins in an extrusion die are large and are less likely to break during the extrusion process. For example, cells 308 constituting the opening 326 can have cross-sectional areas in a plane parallel to the end face 302 that are substantially the same size as an average cross-sectional area of cells 308 in rings of cells proximate the opening 326.

The cells 308 can be arranged in a plurality of circumferential rings 330, each encircling the central point 328. For example, a specific circumferential ring 330 can be a group of cells channels 308 arranged circumferentially side-by-side so as to encircle the central point 328, wherein the central point 328 is the central point of the specific ring 330. The honeycomb body 300 can comprise one or more zones 334, wherein each of the zones 334 comprises one or more rings 330 of cells 308. A zone comprises one or more rings 330 that can have substantially the same cell densities or that have cell densities that vary within the zone based on a common mathematical function. For example, a first zone can comprise rings 330 of cells 308 having substantially the same cell densities throughout the first zone. A second zone can comprise rings 330 of cells 308 that vary by the same function, such as a linear function, non-linear function, tangential function, exponential function, and the like.

In some embodiments, one or more zones comprise two or more rings 330 of cells 308 (e.g., two or more adjacent rings 330 of cells 308, three or more adjacent rings 330 of cells 308, five or more adjacent rings 330 of cells 308, or ten or more adjacent rings 330 of cells 308). The embodiment of the honeycomb body 300 depicted in FIG. 3A comprises an inner zone 334A, an intermediate zone 334B, and an outer zone 334C. In some embodiments, the inner zone 334A does not comprise the opening 326. In other embodiments, the inner zone 334A comprises the opening 326. In some embodiments, the honeycomb body 300 may comprise more or less zones 334 than shown.

Figure 3B:
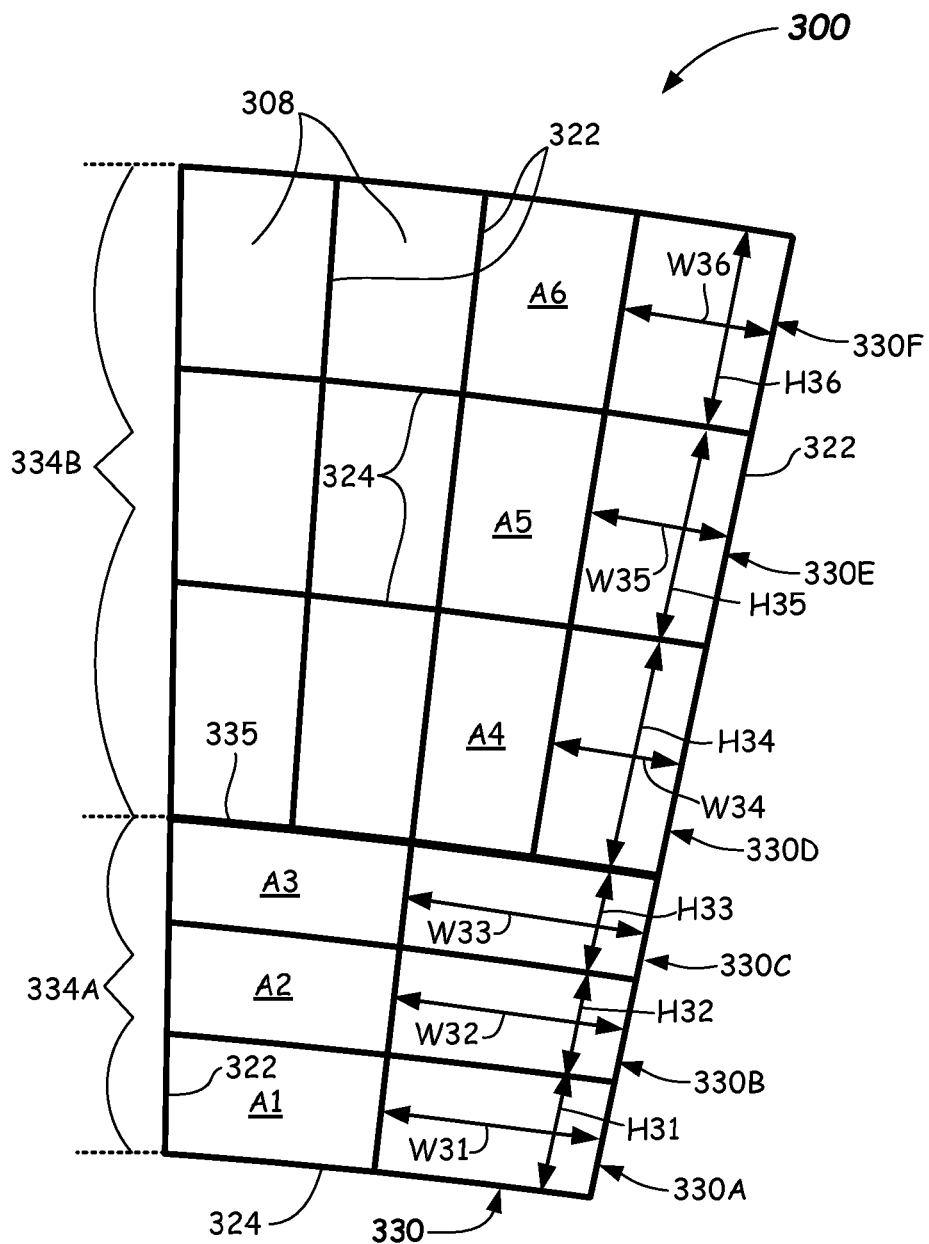
FIG. 3B illustrates an enlarged portion of the segment of the honeycomb body of FIG. 3A according to some embodiments.

Additional reference is made to FIG. 3B, which shows an enlarged portion of the honeycomb body 300 of FIG. 3A. Specifically, FIG. 3B shows a portion of the inner zone 334A, the intermediate zone 334B, and a circumferential transition wall 335 between the inner zone 334A and the intermediate zone 334B. The portion of the honeycomb body 300 shown in FIG. 3B comprises three rings in the inner zone 334A and three rings in the intermediate zone 334B. In some embodiments, the inner zone 334A comprises one or more rings and, in other embodiments, the inner zone 334A comprises two or more rings. The portion of the inner zone 334A shown in FIG. 3B comprises a first ring 330A, a second ring 330B, and a third ring 330C. The portion of the intermediate zone 334B shown in FIG. 3B comprises a fourth ring 330D, a fifth ring 330E, and a sixth ring 330F. The rings can have different cell densities. For example, the number of cells channels 308 per unit area in one ring may be different than the number of cell channels 308 per unit area in another ring. In some embodiments, cell densities of inner rings are greater than cell densities of outer rings. For example, cell densities in the first ring 330A, the second ring 330B, and the third ring 330C can be greater than cell densities than the fourth ring 330D, the fifth ring 330E, and the sixth ring 330F.

The different cell densities enable rings 330 of cells 308 in the honeycomb body 300 having relatively greater air flow to have higher cell densities than rings 330 of cells 308 having relatively lower air flow. The cell densities can vary as a function of the distance of rings from the central point 328 (FIG. 3A). For example, in some embodiments, the cell densities decrease as a function of distance from the central point 328.

The cell densities of the zones can vary between 100 cells per square inch (CPSI) (16 cells per square centimeter (CPC)) and 900 CPSI (140 CPC). Some embodiments comprise greater or lesser cell densities. In some embodiments, cell densities in the inner zone 334A vary between 400 CPSI (62 CPC) and 900 CPSI (140 CPC). For example, cell densities in the outer zone 334C can vary between 100 and 600 CPSI (16 and 93 CPC). Cell densities in the intermediate zone 334B can vary between cell densities in the inner zone 334A and the outer zone 334C. A cell density ratio (CDR) is the ratio of the cell density of a first group (e.g., ring) of cells to the cell density of a second group (e.g., ring) of cells. In some embodiments, the CDR of an inner ring of cells to an outer ring of cells is $1.25 \leq CDR \leq 4.0$. In some embodiments, the CDR is $1.25 \leq CDR \leq 2.0$. In other embodiments, the CDR is $1.25 \leq CDR \leq 1.75$.

The cell density of a ring is proportional to the area of each cell in the ring. In some embodiments, each cell in a ring has the same cross-sectional area. The areas of the cells 308 in the rings 330 are shown in FIG. 3B as area A1, which is the area of cells 308 in the first ring 330A to area A6, which is the area of cells 308 in the sixth ring 330F. The areas of the cells 308 in the rings 330 are proportional to the products of their widths and heights. In some embodiments, the heights of the cells 308 are formed to maintain specific areas of cells 308, which results in specific cell densities in the rings 330.

Figure 4A:
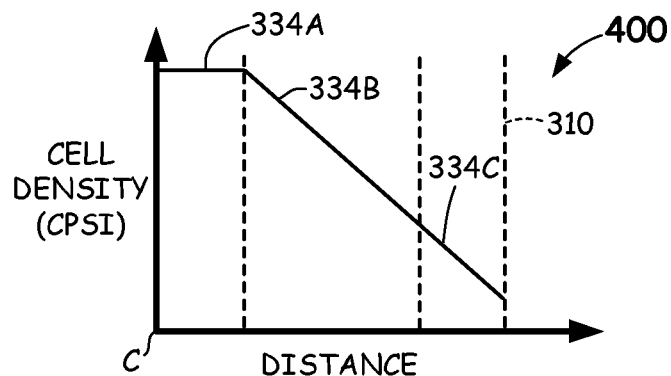
FIG. 4A illustrates a graph showing cell densities of rings of cells in an inner zone of a honeycomb body being constant and cell densities of rings of cells in intermediate and outer zones decreasing linearly as a function of distance from a center line (C) of the honeycomb body according to some embodiments.

An embodiment of the honeycomb body 300 is described below wherein cell densities of rings in the inner zone 334A are constant and cell densities of rings in the intermediate zone 334B and the outer zone 334C decrease linearly as a function of distance from the central point 328. Reference is made to FIG. 4A, which shows a graph 400 representative of cell density of a honeycomb body 300 as a function of distance from the peripheral surface 327 of the opening 326. In the embodiment of FIG. 4A, cell densities of rings of cells 308 in the inner zone 334A are substantially constant (substantially the same). Cell densities of rings of cells 308 in the intermediate zone 334B and the outer zone 334C decrease linearly. The linearity of the graph 400 in the intermediate zone 334B and the outer zone 334C is for illustration purposes. The cell densities in the intermediate zone 334B and the outer zone 334C decrease discretely as a function of distance, with discrete transitions at each transition from one ring to an adjacent next ring. Linear decreases in cell densities can comprise situations where the difference in cell densities between first and second adjacent rings of cells 308 is the same difference in cell densities between second and third adjacent rings of cells. The slopes of the intermediate zone 334B and the outer zone 334C can be the same or different negative slope (non-zero).

As described above, in the embodiment of FIG. 4A, the cell densities of the rings 330A, 330B, and 330C in the inner zone 334A are constant and are greater than the cell densities of rings 330D, 330E, and 330F in the intermediate zone 334B. In some embodiments, the inner zone 334A can comprise two or more rings of cells 308. Referring to FIG. 3B, the radial structure of the honeycomb body 300 causes the widths of the cells 308 to increase as a function of distance from the peripheral surface 327, such that the width W32 is greater than the width W31 and the width W33 is greater than the width W32, wherein W31, W32, W33 are measured at mid-section of each cell. In order to maintain the areas A1, A2, and A3 of the rings 330A, 330B, and 330C of cells 308 in the inner zone 334A substantially the same, the heights of the rings in the inner zone 334A can decrease slightly as a function of distance from the peripheral surface 327. Thus, the height H32 can be less than the height H31 and the height H33 can be less than the height H32.

The cell densities of the rings 330D, 330E, and 330F of cells 308 in the intermediate zone 334B can decrease linearly as a function of their distance from the peripheral surface 327 or other convergence point of the radial walls 322. For example, the difference between the area A4 and the area A5 can be the same as the difference between the area A5 and the area A6. The radial walls 322 may cause the changes in widths of cells 308 in adjacent rings 330 to be linear. The heights H34, H35, and H36 of the cells 308 forming the rings 330D, 330E, and 330F can be set based on a particular slope at which the cell densities decrease as a function of their distance from the peripheral surface 327. In some embodiments, the intermediate zone 334B and the outer zone 334C are combined to form a single zone of cells 308 with cell densities that decrease linearly.

The honeycomb body represented by the graph 400 of FIG. 4A provides an inner zone 334A having high strength relative to conventional honeycomb bodies having radially-extending walls. The configuration can further provide relatively higher cell densities toward the central point 328 of the honeycomb body 300 where exhaust flow is the greatest and relatively lower cell densities toward the outer periphery of the honeycomb body 300 where exhaust flow is relatively lower or minimal. The relatively higher cell density in the inner zone 334A provides for more effective surface area for catalyst application and thus more efficient use of catalyst washcoat.

Figure 4B:
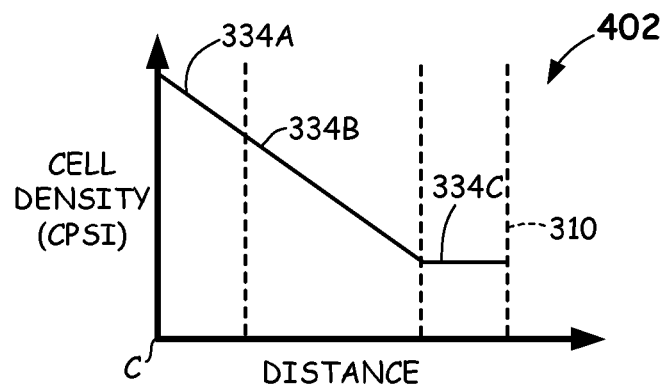
FIG. 4B illustrates a graph showing cell densities of rings of cells in inner and intermediate zones of a honeycomb body decreasing linearly as a function of distance from a center line (C) of the honeycomb body and cell densities of rings of cells in an outer zone being constant according to some embodiments.

FIG. 4B shows a graph 402 representative of a honeycomb body 300 where the cell densities of rings in the inner zone 334A and the intermediate zone 334B decrease linearly as a function of radial distance from the peripheral surface 327 or the central point 328. In some embodiments, the cell densities of rings 330 in the inner zone 334A and the intermediate zone 334B decrease linearly as a function of radial distance from the peripheral surface 327. Cell densities of rings 330 in the outer zone 334C can be constant. In the embodiment depicted in the graph 402, the slopes in which the cell densities decrease can be substantially constant between the inner zone 334A and the intermediate zone 334B. Accordingly, the inner zone 334A and the intermediate zone 334B can be a single zone. In other embodiments, the slopes change between the inner zone 334A and the intermediate zone 334B. For example, cell densities in the inner zone 334A can decrease with a first slope and cell densities in the intermediate zone 334B may decrease with a second slope. The second slope can be less than the first slope in some embodiments. The embodiment of a honeycomb body 300 represented by the graph 402 can provide improved strength by the constant cell density in the outer zone 334C, which is proximate the peripheral skin 310 (FIG. 3A). Further, the relatively higher cell density in the inner zone 334A can provide for more effective surface area for catalyst application.

Figure 4C:
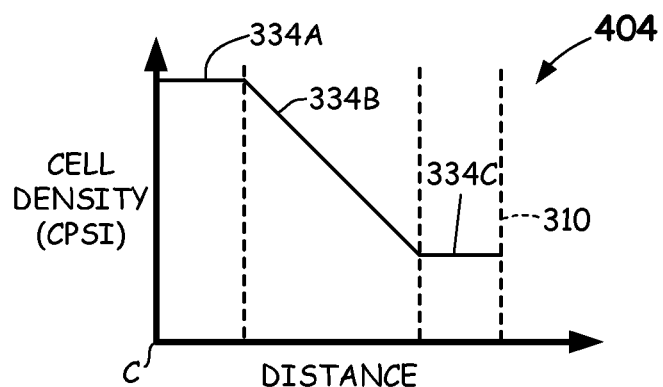
FIG. 4C illustrates a graph showing cell densities of rings of cells in an inner zone and an outer zone of a honeycomb body being constant and cell densities of rings of cells in an intermediate zone decreasing as a function of distance from a center line (C) of the honeycomb body according to some embodiments.

FIG. 4C shows a graph 404 representative of an embodiment of the honeycomb body 300 where the cell densities of rings 330 of cells 308 in the inner zone 334A and the outer zone 334C are substantially constant. For example, the inner zone 334A can have two or more rings of cells 308 and the two or more rings of cells 308 can have substantially the same cell densities. Likewise, the outer zone 334C can have two or more rings of cells 308 and the two or more rings of cells 308 may have substantially the same cell densities. The honeycomb body 300 can have 1.25≤CDR≤4.0 wherein CDR is the cell density ratio of the cell density of the inner zone 334A divided by the cell density of the outer zone 334C. The honeycomb body 300 according to the graph 404 may implement the rings of cells 308 in the inner zone 334A and the intermediate zone 334B in the same manner as described above with reference to the graph 400 of FIG. 4A. The rings in the outer zone 334C can be implemented in the same manner as the rings in the inner zone 334A of the graph 400 of FIG. 4A. The configuration of the honeycomb body 300 represented by the graph 404 of FIG. 4C provides many of the same benefits described above with reference to FIG. 4A. The configuration of FIG. 4C can provide additional strength by maintaining constant cell densities in the rings of the outer zone 334C proximate the peripheral skin 310. Further, the relatively higher cell density in the inner zone 334A can provide for more effective surface area for catalyst washcoat application at the inner zone 334A.

Figure 4D:
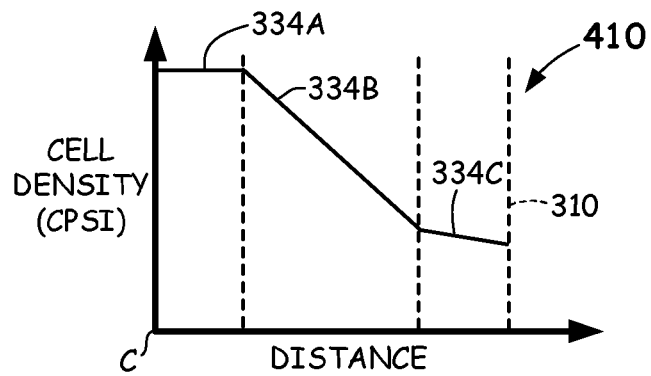
FIG. 4D illustrates a graph showing cell densities of rings of cells in an inner zone of a honeycomb body being constant, cell densities of rings of cells in an intermediate zone decreasing linearly at a first slope as a function of distance from a center line (C) of the honeycomb body, and cell densities of rings of cells in an outer zone decreasing linearly at a second slope as a function of distance from a center line (C) of the honeycomb body, and where the second slope is different than the first slope according to some embodiments.

FIG. 4D shows a graph 410 representative of an embodiment of the honeycomb body 300 where the cell densities of rings of cells 308 in the outer zone 334C decrease with a slope that is different than the slope of a decrease in cell densities of rings in the intermediate zone 334B. The honeycomb body 300 represented by the graph 410 can be implemented by reducing the slope or the rate at which the cell densities in the rings in the outer zone 334C decrease relative to the slope in the intermediate zone 334B. The relatively lower slope in the outer zone 334C may increase the strength of the honeycomb body 300 over an embodiment where the slope between the intermediate zone 334B and the outer zone 334C does not change. The slope profile of the graph 410 can at least partially be similar to the air flow profile through the honeycomb body 300. The embodiment of graph 410 can be implemented by changing the heights of the cells 308 between the intermediate zone 334B and the outer zone 334C.

Figure 4E:
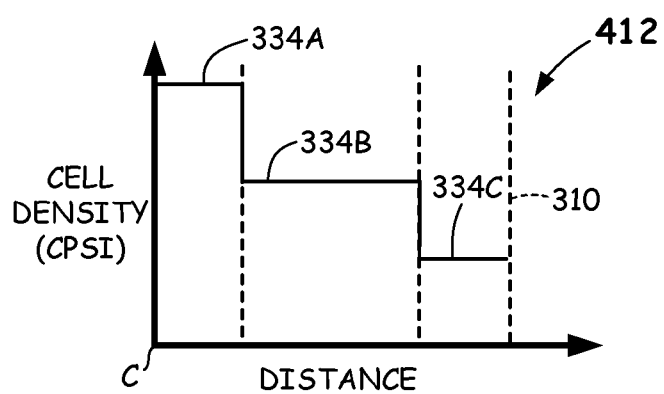
FIG. 4E illustrates a graph showing cell densities of rings of cells in an inner zone of a honeycomb body being constant, cell densities of rings of cells in an intermediate zone being constant, and cell densities of rings of cells in an outer zone being constant wherein the cell densities in each of the respective zones are reduced as a function of distance from a center line (C) of the honeycomb body according to some embodiments.

FIG. 4E shows a graph 412 representative of an embodiment of the honeycomb body 300 where the cell density of the rings of cells 308 within all the zones are substantially constant. The cell densities of rings of cells 308 in the inner zone 334A are substantially constant and have a first cell density, the cell densities of rings of cells 308 in the intermediate zone 334B are substantially constant and have a second cell density, and cell densities of rings of cells 308 in the outer zone 334C are substantially constant and have a third cell density. The sudden changes in cell densities shown in the graph 412 are sometimes referred to herein as "step-wise" transitions. Thus, the areas of cells 308 in the inner zone 334A are substantially constant, the areas of cells 308 in the intermediate zone 334B are substantially constant, and the areas of cells 308 in the outer zone 334C are substantially constant. The constant cell areas in the respective zones assists in providing high strength in the honeycomb body 300, as well as providing for more effective surface area at the inner zone 334A for catalyst washcoat application.

The honeycomb body 300 has been described above as comprising linearly decreasing cell densities in rings 330 of cells 308 as a function of distance from the peripheral surface 327. In other embodiments, the cell densities may decrease nonlinearly. Examples of nonlinear decreasing cell densities comprise cell densities that decrease exponentially or as trigonometric functions. The nonlinear decreases in cell densities in some embodiments correspond to exponential decreases in exhaust flow profiles though the honeycomb body 300 as a function of radial distance. For example, exhaust flow can be very high in the central region 320 of the honeycomb body 300 and decrease nonlinearly while progressing radially toward the peripheral skin 310. The nonlinear decrease in cell densities can correspond to the nonlinear decrease in exhaust flow profile from the central region 320 of the honeycomb body 300 toward the peripheral skin 310.

Figure 4F:
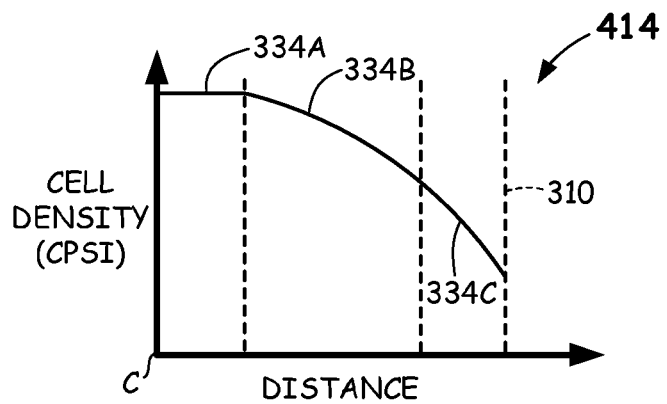
FIG. 4F illustrates a graph showing cell densities of rings of cells in an inner zone of a honeycomb body being constant and cell densities of rings of cells in an intermediate zone and an outer zone decreasing nonlinearly as a function of distance from a center line (C) of the honeycomb body according to some embodiments.

Reference is made to FIG. 4F, which is a graph 414 representative of the honeycomb body 300 comprising a nonlinear decrease in cell densities as a function of distance. The honeycomb body 300 further comprises substantially constant cell densities of rings of cells 308 in the inner zone 334A. As shown by the graph 414, cell densities of rings of cells 308 in the intermediate zone 334B and the outer zone 334C decrease nonlinearly. In some embodiments, the cell densities in the outer zone 334C continue the exponential decrease of cell densities in the intermediate zone 334B. In some embodiments, cell densities in the outer zone 334C decrease at a different rate (e.g., different exponential or other rate) than the decrease in cell densities in the intermediate zone 334B. For example, the cell densities can decrease exponentially per a first function in the intermediate zone 334B and the cell densities may decrease per a second function in the outer zone 334C. In some embodiments, cell densities of rings of cells 308 in the outer zone 334C decrease linearly. In another embodiment, the cell densities of rings of cells 308 in the outer zone 334C can have substantially constant cell densities.

Figure 4G:
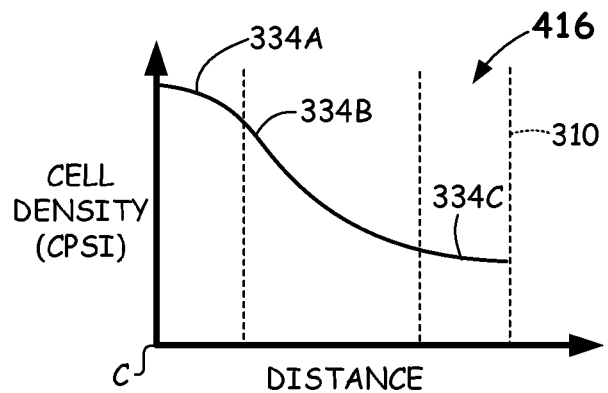
FIG. 4G illustrates a graph showing cell densities of rings of cells in all zones of a honeycomb body decreasing nonlinearly as a function of distance from a center line (C) of the honeycomb body according to some embodiments.

Additional reference is made to FIG. 4G, which is a graph 416 showing an embodiment of the honeycomb body 300 wherein the cell densities in all zones decrease nonlinearly. In the graph 414, the cell densities decrease as a trigonometric function. For example, the nonlinear function can comprise slopes that are near zero near the center C of the inner zone 334A and the outer portion of the outer zone 334C. The decrease in cell density as a function of distance follows an exhaust flow profile across the honeycomb body 300 in some embodiments.

The nonlinear decrease in cell density within the region or regions can be achieved by changing the heights of cells from one ring of cells 308 to an adjacent ring of cells 308. In such a situation, the heights and widths of the cells 308 increase as a function of their distance from the central point 328 (center C), so as to cause the areas of the cells 308 to increase. The graphs depicting nonlinear changes in cell densities are shown as smooth curves for illustration purposes. However, it should be understood that the changes in cell densities from one ring of cells 308 to another are discreet changes.

Referring again to FIG. 3A, it is to be appreciated that the honeycomb body 300 can comprise circumferential rings where the cells 308 can become very wide and short as their distance from the central point 328 (center C) increases. Ring 352 is an example where the cells 308 have become very short and wide. These short, wide cells 308 can reduce the strength of the honeycomb body 300 and impede airflow through these cells 308. A transition ring or zone can be located in the honeycomb body 300 to enable transitions to narrower and taller cells 308 within the honeycomb body 300. The embodiment shown in FIGS. 3A and 3B has a transition that is a circumferential transition wall 335. In some embodiments, the circumferential transition wall 335 is thicker than other circumferential walls 324 in the honeycomb body 300, as depicted in FIG. 3B. In some embodiments, the circumferential transition wall 335 is located within a zone and not between zones.

Figure 5:
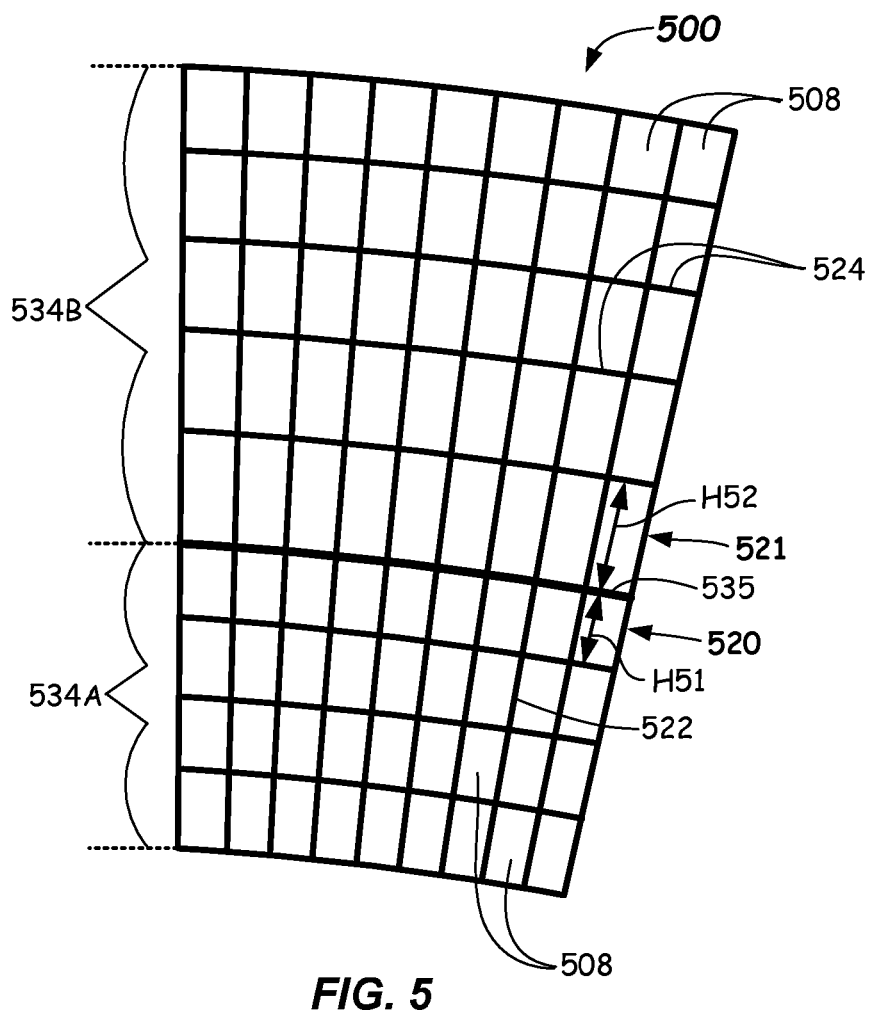
FIG. 5 illustrates an enlarged portion of a honeycomb body comprising a first zone and a second zone with a transition separating the first zone from the second zone according to some embodiments.

Reference is now made to FIG. 5, which shows a portion of a honeycomb body 500 comprising an inner zone 534A and an intermediate zone 534B with a transition wall 535 separating the inner zone 534A from the intermediate zone 534B. In the embodiment of FIG. 5, cell densities of rings of cells 508 of the inner zone 534A are greater than cell densities of rings of cells 508 of the intermediate zone 534B. Radial walls 522 and circumferential walls 524 form a plurality of cells 508. The radial walls 522 extend between the inner zone 534A and the intermediate zone 534B across the transition wall 535, which provides additional strength to the honeycomb body 500 at the transition wall 535. The decrease in cell densities between the inner zone 534A and the intermediate zone 534B can be achieved by changing the heights of cells 508 located adjacent the transition wall 535. For example, a height H51 of cells 508 in a first ring 520 of cells 508 adjacent the transition wall 535 can be less than a height H52 of cells 508 in a second ring 521 of cells 508 located adjacent, and radially outward from the transition wall 535. Other configurations for transitions may be used in the honeycomb body 500. The transition wall 535 can be thicker than the radial walls 522 and circumferential walls 524 in some embodiments. The cell densities are described in FIG. 5 as decreasing across the transition wall 535 from the inner zone 534A to the intermediate zone 534B.

Figure 6:
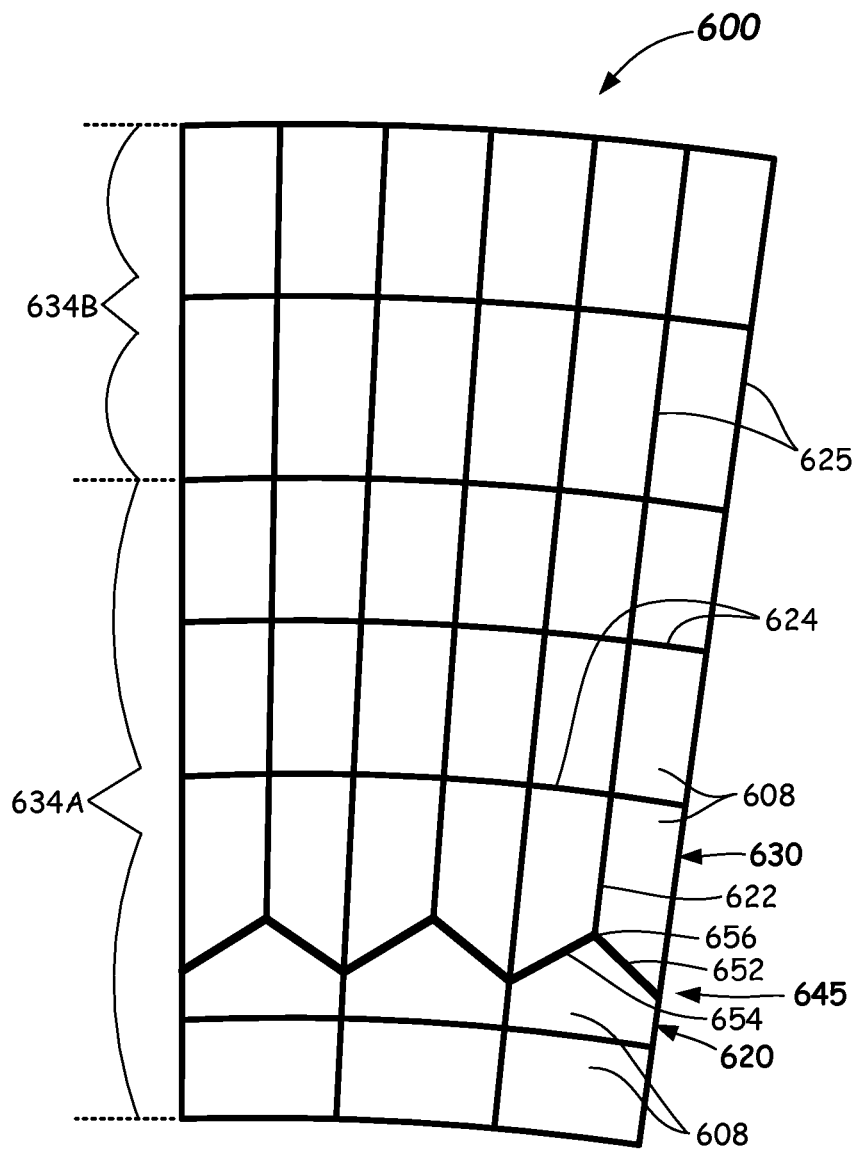
FIG. 6 illustrates a portion of a honeycomb body comprising a transition having inclined walls according to some embodiments.

Reference is now made to FIG. 6, which shows a portion of a honeycomb body 600 comprising an embodiment of a transition web 645. The transition web 645 is adjacent to a first ring 620 of cells 608 and a second ring 630 of cells 608. In the embodiment depicted in FIG. 6, the transition web 645 is within an inner zone 634A of circumferential rings 620, 630 of cells 608. In other embodiments, the transition web 645 or another transition web can be a transition between the inner zone 634A of rings and an intermediate zone 634B of rings. For example, the transition web 645 can be located between zones. For example, the first ring 620 of cells 608 can be located in the inner zone 634A and the second ring 630 can be located in the intermediate zone 634B. The transition web 645 can be located between any zones or within any zones in the honeycomb body 600.

In some embodiments, the transition web 645 intersects a radial wall 622 that intersects a first inclined wall 652 and a second inclined wall 654 at an intersection point 656. The first inclined wall 652 and the second inclined wall 654 intersect the radial wall 622 at angles different than the angles the circumferential walls 624 intersect the radial walls 625. The first inclined wall 652 and the second inclined wall 654 more effectively spreads/transfers the loads within the honeycomb body 600, which increases the strength of the honeycomb body 600.

Figure 7A:
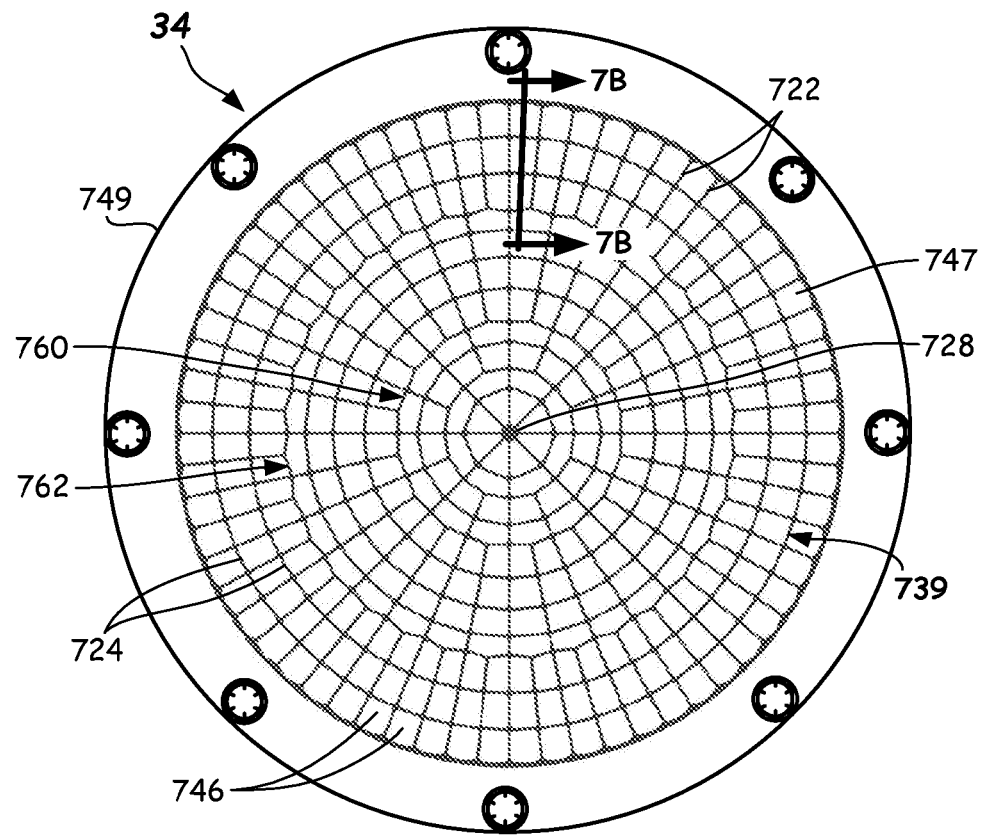
FIG. 7A illustrates a front plan view of a front face of an extrusion die configured to extrude a honeycomb body according to some embodiments.
Figure 7B:
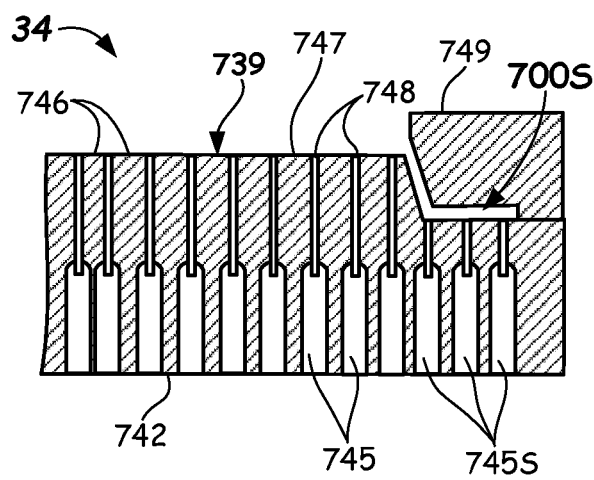
FIG. 7B illustrates a cross-sectional partial view of the extrusion die of FIG. 7A taken along section line 7B-7B of FIG. 7A according to some embodiments.

Referring now to FIGS. 7A and 7B, an embodiment of a honeycomb extrusion die 34 (FIG. 1A) is shown in greater detail. The honeycomb extrusion die 34 can be configured to manufacture the honeycomb body 200 (FIG. 2), the honeycomb body 300 (FIG. 3A), the honeycomb body 600 (FIG. 6), and other honeycomb bodies according to some embodiments of the disclosure. The honeycomb extrusion die 34 can be modified to manufacture honeycomb bodies represented by the graphs of FIGS. 4A-4G with wall thicknesses represented by graphs of FIGS. 8A-8G. The honeycomb bodies 200, 300, 600 can be formed by extrusion of a mixture 33 through the honeycomb extrusion die 34 to produce a green honeycomb body 200. Mixtures are described, for example, in U.S. Pat. Nos. 3,885,977, 5,332, 703, 6,391,813, 7,017,278, 8,974,724, WO2014/046912, and WO2008/066765. The green honeycomb body 200 can then be dried, such as described in U.S. Pat. Nos. 9,038,284, 9,335,093, 7,596,885, and U.S. Pat. No. 6,259,078. The green honeycomb body 200 can then be fired, such as described in U.S. Pat. Nos. 9,452,578, 9,446,560, 9,005,517, 8,974,724, 6,541,407, and U.S. Pat. No. 6,221,308 to form one of the honeycomb bodies 200, 300, 600 comprising the wall geometry and microstructure described herein.

In some embodiments, the honeycomb extrusion die 34 comprises a die body 739, a die inlet face 742 configured to receive a mixture 33, and a die outlet face 747 opposite from the die inlet face 742 and configured to expel mixture in the form of an extrudate having a honeycomb structure 200. The honeycomb extrusion die 34 can be coupled to the extruder 20 (FIG. 1A) as described above.

The honeycomb extrusion die 34 can comprise a plurality of feedholes 745 (a few labeled) extending from the die inlet face 742 into the die body 739 and intersecting with an array of slots 748 (a few labeled) extending into the die body 739 from the die outlet face 747 and connecting with the plurality of feedholes 745. A plurality of pins 746 define the slots 748. The slots 748 are located between the pins 746.

The feedholes 745 supply mixture to the array of slots 748. The intersecting array of slots 748 comprises radial slots 722 (e.g., radially-extending slots, a few labeled in FIG. 7A) and circumferential slots 724 (e.g., circumferentially-extending slots, a few labeled in FIG. 7A). The radial slots 722 are arranged to diverge from one another with respect to a central point 728 as the radial slots 722 extend toward an outermost periphery of the honeycomb extrusion die 34. In some embodiments, the circumferential slots 724 are straight, which produces straight circumferential walls between adjacent radial walls in the honeycomb bodies. The circumferential slots 724 can be arranged concentrically with respect to the central point 728.

The honeycomb extrusion die 34 can comprise one or more transitions between two or more zones of rings as described above. The honeycomb extrusion die 34 depicted in FIG. 7A comprises a first transition 760 and a second transition 762. Slots radially inward from the first transition 760 constitute an inner zone and may be configured to extrude the inner zone 334A (FIG. 3A) of the honeycomb body 300. Slots located between the first transition 760 and the second transition 762 constitute an intermediate zone and can be configured to extrude the intermediate zone 334B (FIG. 3A) of the honeycomb body 300. Slots located radially outward from the second transition 762 constitute an outer zone and can be configured to extrude the outer zone 334C (FIG. 3A) of the honeycomb body 300. The pins 746 can be arranged such that $1.25 \leq PDR \leq 4.0$, wherein PDR is a pin density ratio of an inner pin density in an inner zone to an outer pin density in an outer zone.

The honeycomb extrusion die 34 can optionally comprise a skin-forming portion 700S formed by a skin-forming mask 749 (e.g., a ring-shaped article) that is coupled to the die body 739 and that interfaces with skin-forming feedholes 745S and/or slots in the skin-forming region to form the outer peripheral surface 110 (skin—see FIG. 1B) on the extruded green honeycomb body 300 formed during the extrusion method. The honeycomb bodies 300 have been described herein as having cell densities that decrease as a function of distance from an inner zone of the honeycomb bodies 300. The honeycomb bodies 300 can have multiple zones as described herein. For example, the honeycomb bodies can have one or more intermediate zones located between an inner zone and an outer zone. Each zone can have different cell densities.

Referring again to FIG. 3A, in some embodiments thicknesses of the radial walls 322 and/or the circumferential walls 324 change as a function of distance from the central point 328 (center C). For example, the thicknesses of the radial walls 322 and/or the circumferential walls 324 can increase as a function of distance from the central point 328. The thicker walls toward the periphery of the honeycomb body 300 strengthen the honeycomb body 300. The thicker walls in the periphery of the honeycomb body 300 may impede airflow through the periphery of the honeycomb body 300, however, this impeded airflow may have minimal impact on the catalytic converter or filter using the honeycomb body 300 because reduced or minimal gas flow can be provided at the periphery. The thicknesses of the walls 322, 324 can increase as functions of distance. For example, the thicknesses of the walls 322, 324 can increase inversely to graphs of FIGS. 4A-4G for example, with the maximum thickness being located adjacent to the peripheral skin 310.

Figure 8A:
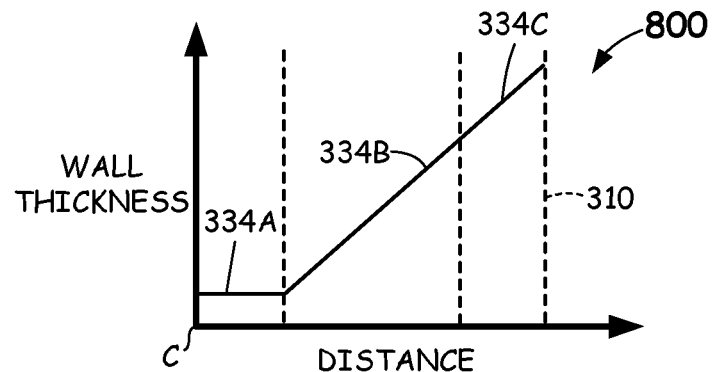
FIG. 8A illustrates a graph showing wall thickness of a honeycomb body being constant in an inner zone and increasing as a function of distance from a centerline (C) in an intermediate zone and an outer zone of the honeycomb body according to some embodiments.
Figure 8B:
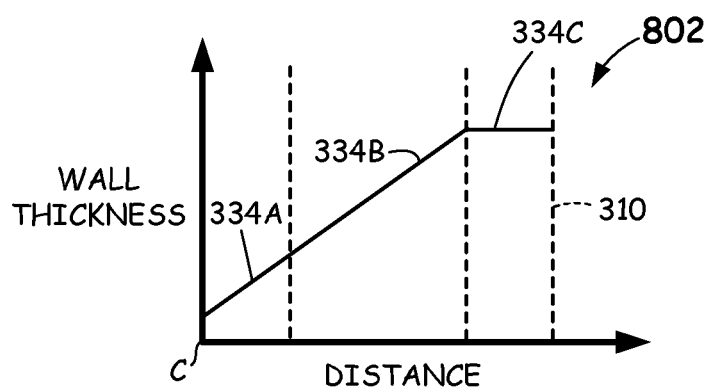
FIG. 8B illustrates a graph showing wall thickness of a honeycomb body increasing in an inner zone and an intermediate zone as a function of distance from a centerline (C) and being constant in an outer zone according to some embodiments.
Figure 8C:
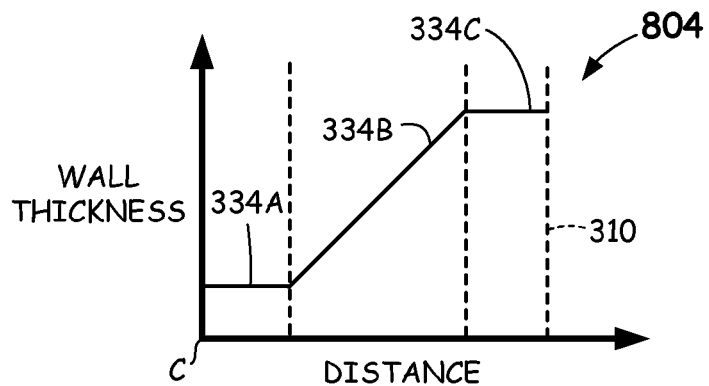
FIG. 8C illustrates a graph showing wall thickness of a honeycomb body being constant in an inner zone and an outer zone and increasing as a function of distance from a centerline (C) in an intermediate zone according to some embodiments.
Figure 8D:
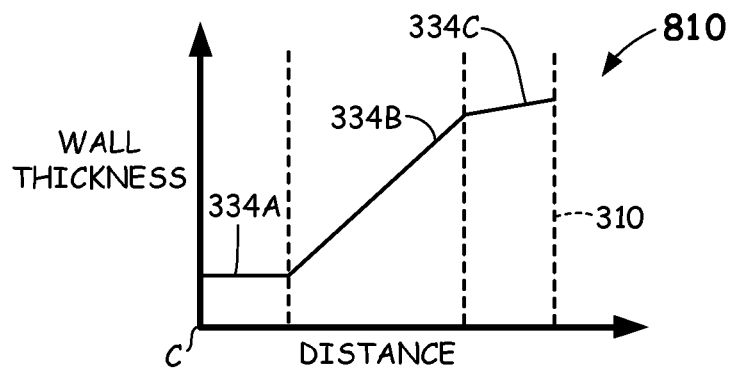
FIG. 8D illustrates a graph showing wall thickness of a honeycomb body being constant in an inner zone and increasing at a first rate in an intermediate zone, and increasing at a second rate in an outer zone as a function of distance from a centerline (C) according to some embodiments.
Figure 8E:
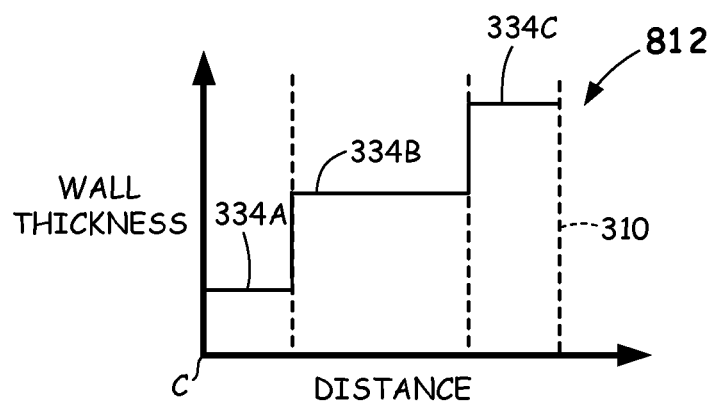
FIG. 8E illustrates a graph showing wall thickness of a honeycomb body being constant, but different, in an inner zone, an intermediate zone, and an outer zone according to some embodiments.
Figure 8F:
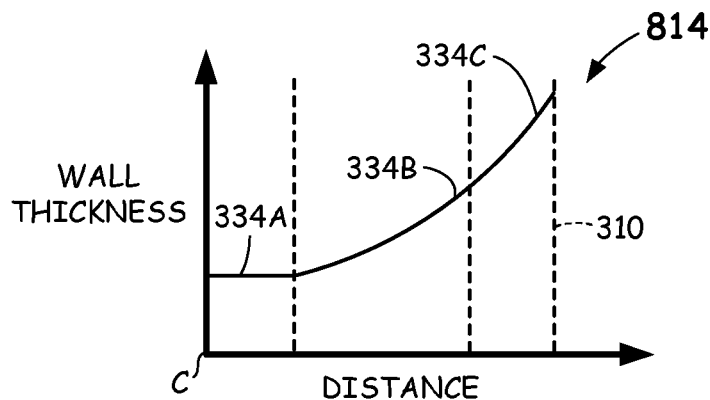
FIG. 8F illustrates a graph showing wall thickness of a honeycomb body being constant in an inner zone and increasing nonlinearly as a function of distance from a centerline (C) in an intermediate zone and an outer zone according to some embodiments.
Figure 8G:
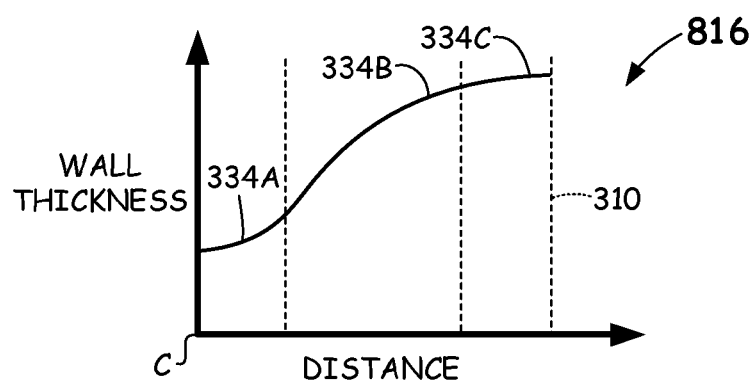
FIG. 8G illustrates a graph showing wall thickness of a honeycomb body increasing nonlinearly as a function of distance from a centerline (C) between an inner zone and an outer zone according to some embodiments

Examples of increased thicknesses of the walls 322, 324 are provided in graphs 800-816 of FIGS. 8A-8G. FIG. 8A shows a graph 800 where the wall thickness is constant in the inner zone 334A and increases in the intermediate zone 334B and the outer zone 334C. FIG. 8B shows a graph 802 where the wall thickness increases in the inner zone 334A and the intermediate zone 334B and is constant in the outer zone 334C. FIG. 8C shows a graph 804 where the wall thickness is constant in the inner zone 334A and the outer zone 334C and increases in the intermediate zone 334B. FIG. 8D shows a graph 810 where the wall thickness is constant in the inner zone 334A, increases at a first rate in the intermediate zone 334B, and increases at a second rate in the outer zone 334C. FIG. 8E shows a graph 812 where the wall thickness is constant, but different, in the inner zone 334A, the intermediate zone 334B, and the outer zone 334C. FIG. 8F shows a graph 814 where the wall thickness is constant in the inner zone 334A and increases nonlinearly in the intermediate zone 334B and the outer zone 334C. FIG. 8G shows a graph 816 where the wall thickness increases nonlinearly between the inner zone 334A and the outer zone 334C.

It will be understood that for the purposes of this disclosure, "at least one of X, Y, and Z" can be construed as X only, Y only, Z only, or any combination of two or more items X, Y, and Z (e.g., XYZ, XY, XZ, YZ). Furthermore, it will be understood that for the purposes of this disclosure, "X, Y, and/or Z" can be construed as X only, Y only, Z only, or any combination of two or more items X, Y, and Z (e.g., e.g., XYZ, XY, XZ, YZ).

It will be apparent to those skilled in the art that various modifications and variations can be made in the present disclosure without departing from the scope of the disclosure. Thus, it is intended that the appended claims cover the modifications and variations of this disclosure provided they come within the scope of the appended claims and their equivalents.

What is claimed is:

1. A honeycomb body comprising:
   a plurality of intersecting porous walls comprised of a plurality of radially-extending walls and a plurality of circumferentially-extending walls, wherein the intersecting porous walls are comprised of a porous ceramic material;
   a central region centrally located on an end face of the honeycomb body;
   wherein at least some of the radially-extending walls extend continuously from the central region of the honeycomb body to a peripheral skin of the honeycomb body;
   wherein the plurality of radially-extending walls and the plurality of circumferentially-extending walls form a plurality of circumferential zones of cells; and
   wherein the plurality of circumferential zones of cells comprises:
      a first zone of cells comprising two or more circumferential rings of cells, each of the two or more circumferential rings of cells of the first zone of cells having a first cell density; and
      a second zone of cells comprising two or more circumferential rings of cells having varying cell densities across the two or more circumferential rings of cells.

2. The honeycomb body of claim 1, wherein the cell densities vary linearly across the second zone of cells.

3. The honeycomb body of claim 1,
wherein the plurality of circumferentially-extending walls have circumferentially-extending wall thicknesses and the plurality of radially-extending walls have radially-extending wall thicknesses, and
wherein at least one of the circumferentially-extending wall thicknesses and the radially-extending wall thicknesses change as a function of their distance to a central point of the honeycomb body.

4. The honeycomb body of claim 1,
wherein the plurality of circumferentially-extending walls have circumferentially-extending wall thicknesses and the plurality of radially-extending walls have radially-extending wall thicknesses, and
wherein at least one of the thicknesses of the circumferentially-extending walls and the radially-extending walls increase linearly in the first zone of cells.

5. The honeycomb body of claim 4,
wherein at least one of the thicknesses of the circumferentially-extending walls and the radially-extending walls increase linearly with a first slope in the first zone of cells, and
wherein at least one of the thicknesses of the circumferentially-extending walls and the radially-extending walls increases linearly with a second slope in the second zone of cells.

6. The honeycomb body of claim 1,
wherein at least one of the plurality of circumferentially-extending walls and the plurality of radially-extending walls have a first constant thickness in the first zone of cells, and
wherein at least one of the plurality of circumferentially-extending walls and the plurality of radially-extending walls have a second constant thickness in the second zone of cells.

7. The honeycomb body of claim 1,
wherein the plurality of circumferentially-extending walls have circumferentially-extending wall thicknesses and the plurality of radially-extending walls have radially-extending wall thicknesses, and
wherein at least one of the thicknesses of the circumferentially-extending walls and the radially-extending walls increase as a trigonometric function in the first zone of cells.

8. The honeycomb body of claim 1,
wherein the first zone is an inner zone of cells comprising two or more inner circumferential rings of cells and having an inner cell density;
wherein the second zone is an outer zone of cells comprising two or more outer circumferential rings of cells having an outer cell density; and
wherein the honeycomb body comprises one or more intermediate zones of cells, wherein each intermediate zone of cells comprises one or more circumferential rings of cells having one or more intermediate zone cell densities between the inner cell density and the outer cell density.

9. The honeycomb body of claim 8, wherein the inner cell density in the inner zone of cells is greater than the outer cell density in the outer zone of cells.

10. The honeycomb body of claim 8, wherein cell densities between the inner zone of cells and the one or more intermediate zones of cells vary step-wise.

11. The honeycomb body of claim 8, wherein cell densities between the outer zone of cells and the one or more intermediate zones of cells vary step-wise.

12. The honeycomb body of claim 8, wherein the one or more intermediate zone cell densities vary as an exponential function across at least one of the one or more intermediate zones of cells.

13. The honeycomb body of claim 8, wherein the one or more intermediate zone cell densities vary linearly across at least one of the one or more intermediate zones of cells.

14. The honeycomb body of claim 8, wherein the one or more intermediate zone cell densities vary as a trigonometric function across at least one of the one or more intermediate zones of cells.

15. The honeycomb body of claim 8, wherein the one or more intermediate zone cell densities varies nonlinearly across at least one of the one or more intermediate zones of cells.

16. The honeycomb body of claim 8,
wherein the plurality circumferentially-extending walls have circumferentially-extending wall thicknesses and the plurality of radially-extending walls have radially-extending wall thicknesses, and
wherein at least one of the circumferentially-extending wall thicknesses and the radially-extending wall thicknesses change as a function of their radial distance to a central point of the honeycomb body.

17. The honeycomb body of claim 1,
wherein the first zone of cells is an inner zone of cells,
wherein the second zone of cells is an outer zone of cells,
wherein $1.25 \leq CDR \leq 4.0$, wherein CDR is a cell density ratio of the first cell density to the second cell density of the honeycomb body, and
cell densities of the circumferential rings of cells varies linearly between the inner zone ring of cells and the outer zone ring of cells.

18. The honeycomb body of claim 1, wherein at least some of the plurality of radially-extending walls extend from a central point of the honeycomb body to the peripheral skin of the honeycomb body.

19. The honeycomb body of claim 1, wherein:
the central region comprises an opening;
at least some of the plurality of radially-extending walls extend from a peripheral surface of the opening to the peripheral skin of the honeycomb body; and
at least some of the plurality of radially-extending walls extend from a central point of the honeycomb body to the peripheral skin of the honeycomb body.

20. A honeycomb body comprising:
a plurality of intersecting porous walls comprised of a plurality of radially-extending walls and a plurality of circumferentially-extending walls, a central region centrally located on an end face of the honeycomb body, wherein at least some of the radially-extending walls extend continuously from the central region of the honeycomb body to a peripheral skin of the honeycomb body and the plurality of radially-extending walls and the plurality of circumferentially-extending walls form a plurality of circumferential zones of cells;
a first circumferential zone of cells having two or more circumferential rings of cells and having a first cell density;
a second circumferential zone of cells having two or more circumferential rings of cells and having a second cell density, the first cell density being greater than the second cell density; and
a transition zone between the first circumferential zone of cells and the second circumferential zone of cells, wherein all radially extending walls in the first circumferential zone of cells adjacent the transition zone extend through the transition zone and into the second circumferential zone of cells.

21. The honeycomb body of claim 20, wherein at least some of the plurality of radially-extending walls extend from a central point of the honeycomb body to the peripheral skin of the honeycomb body.

22. The honeycomb body of claim 20, wherein:
the central region comprises an opening;
at least some of the plurality of radially-extending walls extend from a peripheral surface of the opening to the peripheral skin of the honeycomb body; and
at least some of the plurality of radially-extending walls extend from a central point of the honeycomb body to the peripheral skin of the honeycomb body.

* * * * *